(12) United States Patent
Chaoji et al.

(10) Patent No.: US 10,380,498 B1
(45) Date of Patent: Aug. 13, 2019

(54) PLATFORM SERVICES TO ENABLE ONE-CLICK EXECUTION OF THE END-TO-END SEQUENCE OF MODELING STEPS

(71) Applicant: Amazon Technologies, Inc., Seattle, WA (US)

(72) Inventors: Vineet Shashikant Chaoji, Bangalore (IN); Aswin Natarajan, Bangalore (IN); Seyit Ismail Parsa, Seattle, WA (US); Rajeev Ramnarain Rastogi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 1018 days.

(21) Appl. No.: 14/720,474

(22) Filed: May 22, 2015

(51) Int. Cl.
*G06F 15/18* (2006.01)
*G06N 20/00* (2019.01)
*G06N 7/00* (2006.01)

(52) U.S. Cl.
CPC ............. *G06N 20/00* (2019.01); *G06N 7/005* (2013.01)

(58) Field of Classification Search
CPC ............................ G06Q 30/0202; G06F 19/24
USPC .............................................. 706/12, 15, 45
See application file for complete search history.

(56) References Cited

U.S. PATENT DOCUMENTS

| | | | | |
|---|---|---|---|---|
| 7,577,709 B1* | 8/2009 | Kolcz | .................. | G06K 9/6217 706/20 |
| 8,417,715 B1* | 4/2013 | Bruckhaus | ........ | G06F 17/30994 705/26.1 |
| 2011/0150323 A1* | 6/2011 | Hancock | .............. | G06K 9/6292 382/159 |
| 2012/0191630 A1* | 7/2012 | Breckenridge | ...... | G06N 99/005 706/12 |
| 2014/0379424 A1* | 12/2014 | Shroff | ................ | G06Q 30/0204 705/7.31 |
| 2016/0203509 A1* | 7/2016 | Sharp, III | .......... | G06Q 30/0244 705/14.43 |

* cited by examiner

*Primary Examiner* — David R Vincent
(74) *Attorney, Agent, or Firm* — Lee & Hayes, P.C.

(57) ABSTRACT

This disclosure is directed to the automated generation of Machine Learning (ML) models. The system receives a user directive containing one or more requirements for building the ML model. The system further identifies common requirements between the user directive and one or more prior user directives and associates characteristics of the prior user directive, or model generated therefrom, with the user directive. The system further associates performance values generated by continuous monitoring of deployed ML models to individual characteristics of the user directive used to generate each of the deployed ML models. The system continuously improves model generation efficiency, model performance, and first run performance of individual ML models by learning from the improvements made to one or more prior ML models having similar characteristics.

20 Claims, 5 Drawing Sheets

PLATFORM SERVICES TO ENABLE ONE-CLICK EXECUTION OF THE END-TO-END SEQUENCE OF MODELING STEPS

BACKGROUND

Machine Learning (ML) techniques have become a powerful data mining approach for extracting useful patterns from increasingly large data sets. ML techniques have proven useful in a broad range of applications, as well. For example, ML techniques have been applied to traditional applications such as digit and character recognition, web search recommendations, demand forecasting, large-scale product classification, handwriting analysis, natural language processing, computer vision systems, etc. Generally, building a ML model to describe patterns in large data sets requires an iterative process involving repeated experimentation across several of the individual model building process steps, including, for example, data preprocessing, data analysis, feature engineering, model training, and model performance evaluation. Typically, each ML model is unique and even if the application shares common features, the ML model must be reconstructed through the iterative experimentation process. Moreover, currently available tools and software for creating ML models require significant and non-trivial manual efforts to support the iterative experimentation. The extent of manual interaction with the ML model is often proportional to the number of models that must be trained, or the amount of data required or utilized for training an ML model. Furthermore, manual interaction with the ML model is typically required throughout the life of the ML model due to changes in input data. For instance, model performance may deteriorate over time if the distribution of the input data changes significantly. Therefore, model performance may require continuous monitoring and retraining of the ML model using the same or similar manual, iterative model building process.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
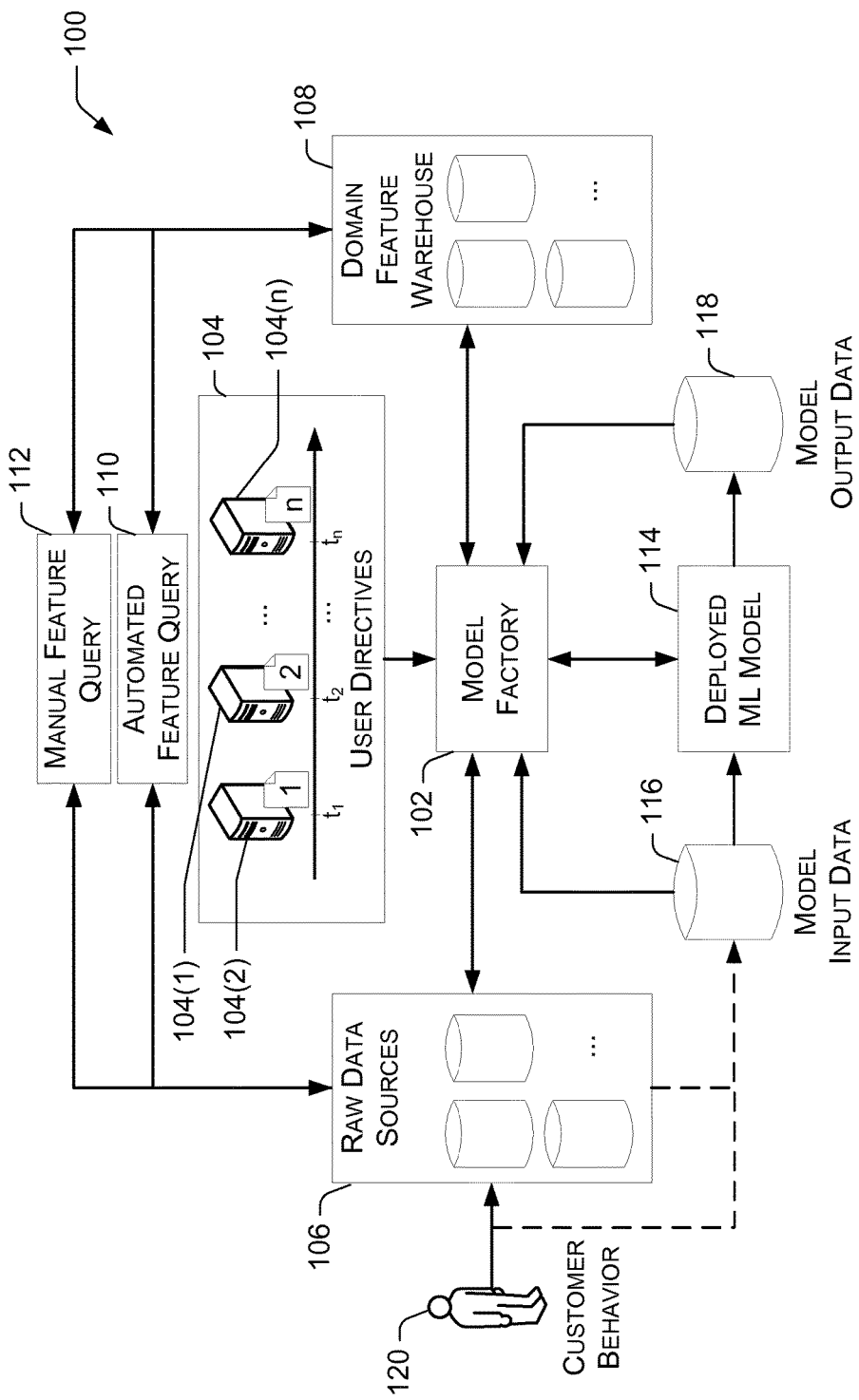
FIG. 1 is a schematic diagram of an illustrative automated model development environment, including a domain feature warehouse and continuous monitoring of model performance capability.

This disclosure sets forth systems and methods for the automated generation and maintenance of machine learning (ML) models, or a ML model pipeline, via a Model Factory. The Model Factory receives a user directive from user input. The user directive may include a plurality of requirements including at least a source of raw data and one or more modeling options, including, for example, a target feature. The Model Factory is configured to generate a ML model based on the raw data source and one or more features from a domain feature warehouse. The Model Factory is also configured to associate prior user directives with a current user directive to facilitate automated ML model development and improve performance of the developed ML models.

For instance, a current user directive may be related to a specific ML modeling task, for example, estimating the propensity, or likelihood, that a customer will sign up for "membership service A." A prior user directive may have created a ML model for determining the propensity of a customer to sign up for "membership service B." If "membership service A" and "membership service B" share the same domain designation, for instance "membership propensity," the Model Factory may associate one or more requirements of the prior user directive with the current user directive. Examples of shared or common requirements, may include, individual features, raw data sources, and/or target features.

Unlike the conventional approaches to Machine Learning discussed above, this disclosure describes automated systems and methods capable of execution across the several process steps required for building an ML model, thereby accelerating model development, enabling building models to scale, and eliminating repetitive manual interactions with the ML model. Additionally, the systems and methods described herein monitor the distributions of input and output data to and from the model over time and trigger model retraining when significant changes are detected in the model performance.

The domain feature warehouse may comprise a copy of the individual features and/or a reference to the location of the individual features, for example, in a look-up table. The domain feature warehouse may also maintain additional data relevant to facilitating automated ML model development. For instance, individual features may be associated with one or more requirements of a user directive and/or a score or indication associated with feedback received from the performance monitoring of an individual ML model using the feature.

The domain feature warehouse may further contain features associated with individual domains or organized by an associated domain. Domains are a common family of modeling tasks that may share data, features, and/or target features. The domain feature warehouse is populated by manual feature queries conducted by individual users or an administrator of the domain feature warehouse. Individual user directives may also result in feature queries of raw data sources. For example, a user directive may result in the Model Factory identifying a domain associated with the user directive and failing to identify one or more available features associated with the domain in the domain feature warehouse. Likewise, the user directive may contain one or more specific feature queries that are not associated with, or correlated to, available features in the domain feature warehouse. When a feature is not available in the domain feature warehouse, the Model Factory may request a manual feature query or execute a feature query based at least in part on data provided by the individual user directive.

In some embodiments, the domain feature warehouse may also self-populate by conducting automated feature queries with available raw data sources. Automated feature queries may be executed periodically, or intermittently, to account for drifts in the raw data sources. An automated feature query may also be the result of a determination by the Model Factory that the model input or output has deviated beyond a predetermined threshold indicating that the model requires retraining. The request to retrain a model may also trigger an update of the domain feature warehouse to incorporate new data available from a raw data source. Automated feature queries, either periodically or as triggered by the Model Factory, improve the efficiency of automated ML model generation and the accuracy of generated models by continuously updating features to account for changes in the raw data sources thereby reducing the likelihood of retraining soon after a ML model is deployed.

The Model Factory may conduct ML modeling steps, including feature extraction, data preparation, feature selection, feature engineering, model selection, model parameter tuning, and model performance monitoring in an automated manner based on the user directive. For example, one or more features associated with a domain according to the user directive, are received by the Model Factory. The Model Factory performs the ML modeling steps as necessary to produce a ML model. The ML model receives model input data and processes model output data. Both model input and model output data is continuously monitored by the Model Factory to determine the performance of the ML model. Based on the determined model performance, the Model Factory may execute all or part of the ML modeling steps to improve model performance of the monitored ML model.

In various embodiments, the Model Factory comprises one or more processors, a computer-readable storage media, and a domain feature warehouse. The computer-readable storage media may include one or more modules for generating features to populate the domain feature warehouse, for generating a ML model based on a user directive, and for continuous monitoring of the performance of a ML model generated by the system. Additionally, a data-sampling module may be executed at various ML modeling steps, such as data preprocessing or model parameter tuning, to assess the accuracy of the model with respect to one or more features.

For instance, a feature extraction module, when executed, may receive raw data based on the user directive. When two or more user directives require modeling tasks from a common domain, the same or a similar set of queries may be used for fetching the raw data. Furthermore, the feature extraction module may derive one or more features for the modeling task from the raw data. One feature is identified as the target feature and provides the label that is eventually learned by the model.

Additionally, a feature preparation module may identify erroneous feature values and impute missing values. Moreover, the feature preparation module may aggregate one or more features and compute the aggregated features within individual queries. For instance, where a user directive is associated with a prior user directive based on a common domain, the Model Factory may identify one or more features associated with the prior user directive that may be used by the current user directive. Performance results of the ML model resulting from the prior user directive may be appended to data contained in the domain feature warehouse indicating the relative success or failure of a particular feature as it relates to the domain. For instance, the appended data may be a data byte or similar unit of memory to which the data is written. The feature preparation module may determine aggregation of features is beneficial based on the appended performance results.

In accordance with one or more embodiments, a feature selection module may determine a set of the most predictive features from the larger set of features from the feature extraction module and the feature preparation module. The smaller set of features is used to improve the model's ability to generalize and typically improves model performance used with large data sets. For instance, the feature selection may use a correlation based feature selection method where the correlation between individual features and the target feature is computed and ranked. Additionally, the feature selection module may use a model based feature selection method to first train a model with all features, identify the features with the highest weight across all features used to train the model, and thereby identify the most predictive features. Furthermore, the weighting of the features may include performance results from a prior ML model.

The Model Factory may execute a cross validation, or rotation estimation, to determine how model results generalize to an independent data set. For instance, the cross validation process may construct multiple train-validation splits from the data train model on each training set and the validation set may be evaluated to identify model parameter values with the lowest average cross validation error.

In accordance with one or more embodiments, the Model Factory may execute a performance-modeling module to compare the distribution of the features before and after model deployment, score the distribution, and compare the scores generated by the model. Scores reaching a predetermined threshold based on one or more performance metrics may trigger a requirement for retraining the model with a newer data set that captures the change in distribution.

In further embodiments, a sampling module may initiate the selection of one or more additional or different features to be associated with the user directive. For instance, if the feature selection module initiates the sampling module to evaluate one or more selected combinations of features, the sampling module may evaluate the features on an independent data set and determine that the features have a high likelihood of generating a model with low initial performance. The feature selection module may then incorporate additional features, or replace current features based on the result of the sampling module.

The techniques, apparatuses, and systems described herein may be implemented in a number of ways. Example implementations are provided below with reference to the following figures.

FIG. 1 is a schematic diagram of an illustrative automated model development environment 100, including a domain feature warehouse and continuously monitoring model performance capability. The Model Factory 102 may include one or more computing devices configured to execute a series of instructions necessary for the autonomous generation and monitoring of a ML model. Individual computing devices may be located remotely from one another. Additionally, individual tasks conducted by the Model Factory 102 may be conducted by individual computers. More generally, computing resources consumed by the Model Factory may be distributed, in a cloud-computing environment, for example. The Model Factory 102 is described in further detail with respect to FIG. 2.

The Model Factory 102 may receive one or more user directives 104 over a period of time. For example, user directive "n" 104(n) may be the most recent user directive generated at time $t_n$ where user directives "1" and "2" may have generated a an earlier time $t_1$ and $t_2$, respectively.

Furthermore, each of the user directives may be associated with a ML model. An example user directive may include an instruction to generate a ML model to determine the identities of registered customers that are likely to sign up for and purchase products from a new electronic store. More particularly, the user directive may indicate one or more specific raw data sources, a target feature, or one or more features required by the user to be incorporated into the ML model to be built to determine, or predict, the identities.

Additionally, each user directive may come from a common computing resource or from a remote computing resource associated with a user. Individual user directives may describe a set of requirements for the automatic generation of a ML model by the Model Factory 102. For instance, the set of requirements may specify one or more particular data sets to use, one or more raw data sources, a target feature, etc. The Model Factory 102 may parse the individual user directives 104 to identify a specific set of requirements associated with the individual directives. With respect to machine learning, a feature may be a measurable property of a phenomenon being observed. A feature may also include an n-dimensional vector of features that represents an object. For instance, in a raw data set that includes consumers' behavior data, a feature may include the ages associated with individual consumers. The target feature may be the variable that the model is measuring. For example, if the ML model's task is to measure the propensity of a customer to sign up for one or more offered services, the target feature may be a percentage likelihood that a customer will sign up for an offered service if presented with the opportunity.

Moreover, the Model Factory 102 may identify commonality between the individual user directives 104 in order to reduce replication of redundant tasks and to improve the quality (i.e. performance) of newly deployed ML models generated by the Model Factory 102. For instance, the Model Factory 102 may identify that a target feature is common between two different user directives over a period of time. The Model Factory 102 may use the ML model generated as a result of an earlier user directive 104(2) to generate a ML model corresponding to a later user directive where the earlier and later directives share one or more common requirements, such as a common target feature or common raw data source.

Based at least in part on the user directive 104, the Model Factory 102 will transmit a request for one or more raw data sources 106, and receive the requested sources. If no specific raw data source is identified in a user directive the Model Factory 102 may determine, based on one or more common requirements with a previous directive, an appropriate raw data source. Alternatively, or additionally, the Model Factory 102 may request confirmation from a user associated with the directive prior to using the determined raw data source to generate a ML model. For example, the Model Factory 102 may determine, based on common requirements identified between two individual user directives 104, a set of queries to associate with individual ones of the user directives 104. The individual queries may request and receive complete (i.e., whole or entire) data sets or one or more partial data sets based on the raw data sources 106. Additionally, the received information may be a reference to the location of the requested data. Partial raw data sets may be aggregated at the Model Factory 102 prior to feature extraction or following feature extraction. Furthermore, the Model Factory 102 may combine identified features before or after aggregation of individual raw data sources or partial raw data sets.

Based at least in part on one or more requirements of an individual user directive 104, and/or the identified complete or partial raw data source 106, the Model Factory 102 determines and requests one or more features from a domain feature warehouse 108. The Model Factory 102 determines, based on the common requirements identified between individual user directives 104 and/or specific features included in a user directive 104(n), a set of features that matches the user directive 104(n) by comparing one or more common requirements across one or more prior user directives, for instance 104(1) and/or 104(2). The domain feature warehouse 108 transmits or sends one or more identified features to the Model Factory 102, or references locations thereto, for inclusion in the model generation process. An exemplary model generation process is described in detail with reference to FIG. 3.

The domain feature warehouse 108 is populated based on a series of user directives 104 where the individual user directives identify one or more specific feature queries that are associated with the domain of the individual user directive. Over time, the domain feature warehouse 108 is populated with domain associated feature queries. Additionally, features may be automatically generated via system generated feature queries 110, or features may be a user or administrator generated manual feature query 112.

In some instances, the domain feature warehouse 108 may be manually populated if the Model Factory 102 fails to identify at least one common feature between the current user directive 104(n) and a prior user directive. Where no features can be automatically associated with an individual directive 104(n) by the Model Factory 102, the user may be required to manually enter one or more manual feature query parameters 112.

The Model Factory 104 may aggregate one or more features stored in the domain feature warehouse 108 into a single feature query. Aggregation may occur at the Model Factory 102 or at the domain feature warehouse 108.

The Model Factory 102 may prune the domain feature warehouse 108 based on performance results of a generated ML model. For instance, the Model Factory 102 may periodically evaluate changes in the input and output data associated with an individual model and if the Model Factory 102 determines that the model should be retrained or updated, where the update requires pruning of the features used to train the model, the Model Factory 102 may indicate, by a flag or indicator in the data structure for example, the feature-model combination as having a reduced relevancy. Additionally, or alternatively, the Model Factory 102 may associate a relevancy score with the feature-model combination, the relevancy score being used to improve the training efficiency of the ML model. The flag or indicator and/or the relevancy score may be appended to the data structure used to define an individual feature, or it may be appended to the data structure of the ML model.

The Model Factory 102 outputs, or deploys, a ML model 114 consistent with an individual user directive 104. The ML model 114 receives model input data 116 and generates model output data 118. The model input data 116 may include one or more data sets, or partial data sets, from the raw data sources 106 or may represent some other customer behavior 120. For instance, where the raw data sources 106 are continuously updated with user behavior data 120, the deployed ML model 114 may receive data from the raw data sources 106. However, the deployed ML model 114 may additionally, or alternatively, receive one or more different data sets from the user, the one or more different data sets not included in the raw data sources 106.

The Model Factory 102 may also constantly monitor the performance of the deployed ML model 114 over time. For instance, the Model Factory 102 may receive all or part of the model input data 116 and monitor the input data 116 for changes in the data over a predetermined period of time. Additionally, the Model Factory 102 may receive all or part of the model output data 118 and similarly evaluate the data for changes over a predetermined period of time. If the Model Factory 102 determines that the model performance has deteriorated by monitoring a significant change in the distribution of input and/or output data over the predetermined period of time, the Model Factory 102 may automatically initiate retraining of the deployed ML model 114. The Model Factory 102 may then retrain and redeploy the retrained ML model.

Figure 2:
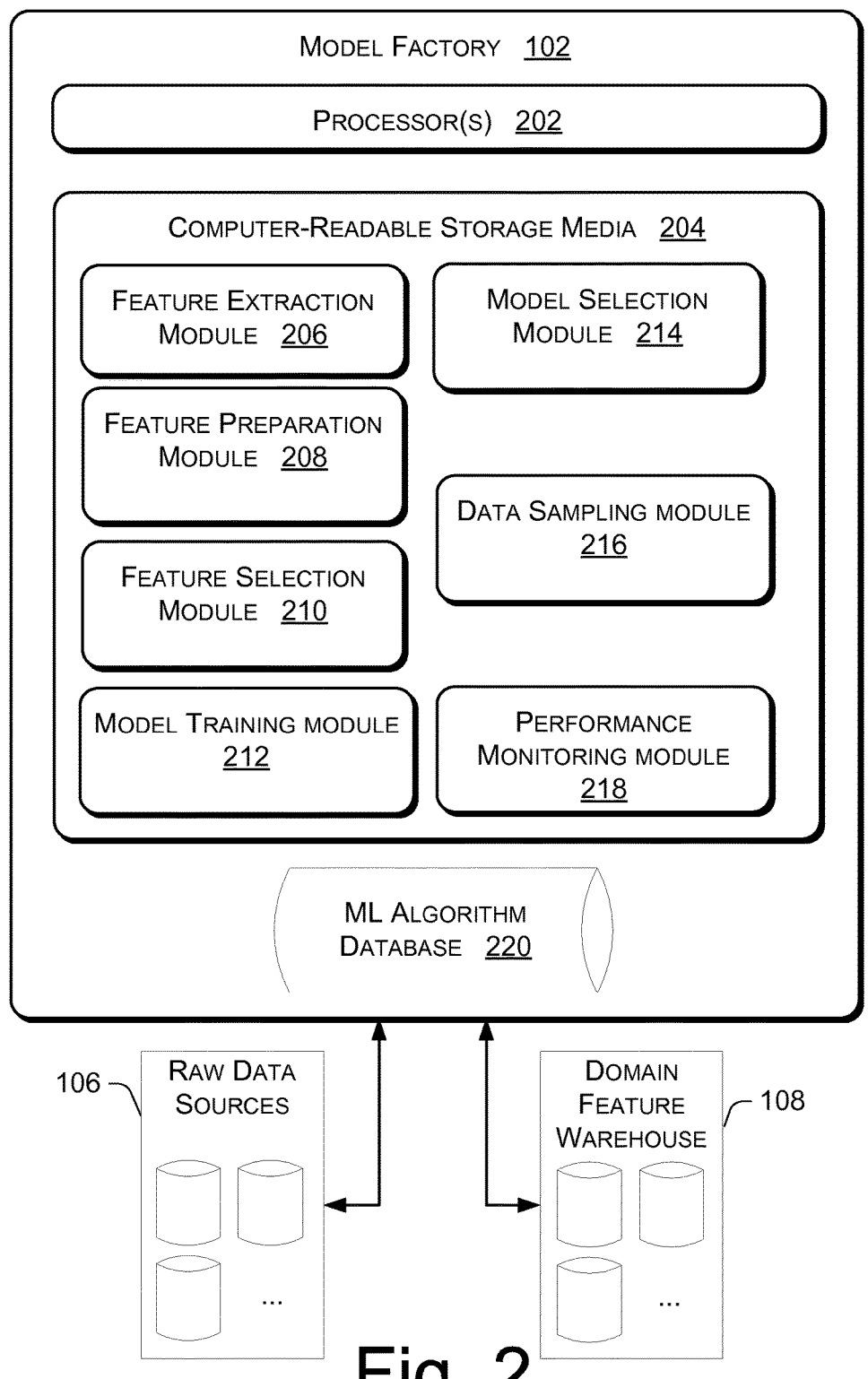
FIG. 2 is a block diagram illustrative of a Model Factory, including a module for generating a domain feature warehouse and a module for continuous monitoring of model performance.

FIG. 2 is a block diagram illustrative of a Model Factory, including a module for generating a domain feature warehouse and a module for continuous monitoring of model performance. FIG. 2 is discussed with reference to FIG. 1. The Model Factory 102 may comprise one or more processors 202 capable of executing one or more modules stored on a computer-readable storage media 204.

The feature extraction module 206 may request one or more features from the domain feature warehouse 108, or a reference location thereto. As discussed above, the domain feature warehouse 108 may be populated by parsing, or extracting, data from one or more raw data sources 106 based on an individual user directive 104 and/or a prior user directive 104. In instances where one or more previous user directives belongs to a common domain as the most current directive, the feature extraction module 206 can associate previously used features with the most current user directive. For example, the multiple directives may be related to a common domain of a membership propensity modeling task, where the modeling task is to determine the propensity, or likelihood, of a customer to subscribe to a membership service (e.g., a new membership service). The Model Factory 102 may use similar features for individual modeling tasks related to membership propensity. More particularly, if one or more membership services are offered, the modeling task may be associated with "membership propensity" and each of the membership services may be modeled using common features. The common features may also be high-level features that are aggregated and applied to modeling membership propensity for a specific membership service.

Furthermore, the feature extraction module 206 may compare individual requirements of individual user directives to determine a similarity between the individual directives. For instance, where a user provides a requirement to use common raw data sources 106, a common target feature, or some combination thereof, the feature extraction module 206 may associate the directives to determine relevant features to be extracted from the domain feature warehouse 108.

The feature preparation module 208 may automatically identify erroneous feature values, and impute missing feature values. Additionally, the feature preparation module 208 may cluster or aggregate features from the raw data. For instance, in the context of the membership propensity-modeling problem, the raw data may consist of a time-series of purchases made by one or more customers, as stored in association with the customer data 120. Purchases may be aggregated across various time intervals (e.g., weekly, monthly, quarterly, etc.) with other features, such as glance views, for example. These aggregations may be computed within the individual queries.

The feature selection module 210 receives the features generated in the feature extraction module 206 and prepared in the feature preparation module 208 and then selects and retains the most predictive features from the larger set of received features. Retaining only the most predictive features improves the generalizability, or performance, of the resulting model presented with large data sets; a problem generally referred to as over-fitting of the model.

The feature selection module 210 may execute one or more algorithms to select the most informative features. For instance, the module may use a correlation based selection method where a correlation value represents the correlation between individual features and the target feature. Correlation values may be ranked and a predetermined number of top ranked features may be retrained by the feature selection module 210. For instance, the correlation value may be a symmetric information gain ratio metric that measures the correlation between two features or a feature and the target feature. Additionally, or alternatively, the feature selection module 210 may execute a model based feature selection method, or a linear model method, where a model is trained with all the features and a predetermined number of features determined to have the highest sum of associated feature weights across all feature values.

The feature selection module 210 may also transform, or engineer, the original features and/or the selected features to improve the resulting model's fit with the target features. For instance, the feature selection module 210 may employ numeric binning, forming conjunctions of existing features, and/or feature transformation by applying a mathematical transformation (e.g., logarithmic or polynomial transformation) to numeric features. Feature engineering may be triggered by an indicator appended to individual features because of prior ML model performance monitoring. For example, a ML model demonstrating poor performance may append an indicator to one or more features associated with the domain of the ML model to indicate that additional feature engineering may be required to improve the initial performance of any model derived from a subsequent user directive sharing a common domain designation. Additionally, feature engineering may result from a combination of one or more indicators appended to one or more features included in ML model training.

The model selection module 214 selects a ML algorithm from an ML algorithm database 220. The ML algorithm database 220 may contain one or more ML modeling algorithms supported by the Model Factory 102 (e.g., linear models, RandomForest, boosted trees, etc.).

The model training module 212 tunes individual parameters of the ML algorithm selected in the model selection module 214 for the relevant datasets (i.e., raw data source, target feature, individual features, etc.). The model-training module 212 may deploy a cross-validation technique to construct multiple train-validation splits from the data. For each split, the model is trained on the train set and evaluated on the validation set. The parameter values that result in the lowest average cross-validation error are selected. The model-training module 212 automatically executes the cross-validation technique to identify the best parameter values associated with the ML algorithm selected in the model selection module 214.

The data-sampling module 216 may be executed by any of the individual modules. For instance, the feature preparation module 208 or the model-training module 212 may execute the data-sampling module 216 to, for example, reduce the size of the data set that is being used and/or reduce the risk of over-fitting the model. For instance, the data-sampling module may be executed after the feature preparation module 208 and/or after the feature selection module 210 to sample all or a portion of data associated with the model build process. The model-training module 212, for example, may execute the data-sampling module 216 at periodic or predetermined time intervals and receive a performance value form the data-sampling module 216. The performance value may represent the effectiveness of the model, and the tuned parameters of the model, to accurately predict the result of a random, or predetermined, set of training data. The set of training data may contain one or more data points, or features.

The performance monitoring module 218 receives model input data 116, including customer behavior 120 or one or more raw data sources 106, and determines a distribution of the data over time. Additionally, or alternatively, the performance monitoring module 218 may receive model output data 118 and similarly determine a distribution of the data over time and/or a change in model performance over time. If the performance monitoring module 218 determines a significant change in the input data distribution, the output data distribution, or the change in model performance over a period of time the performance monitoring module 218 may retrain the model. Additionally, the performance monitoring module 218 may intermittently execute the data-sampling module 216 to determine instantaneous performance of the model and changes in the model performance over time. Detecting significant changes may trigger retraining by the model-training module 212, for example.

Figure 3:
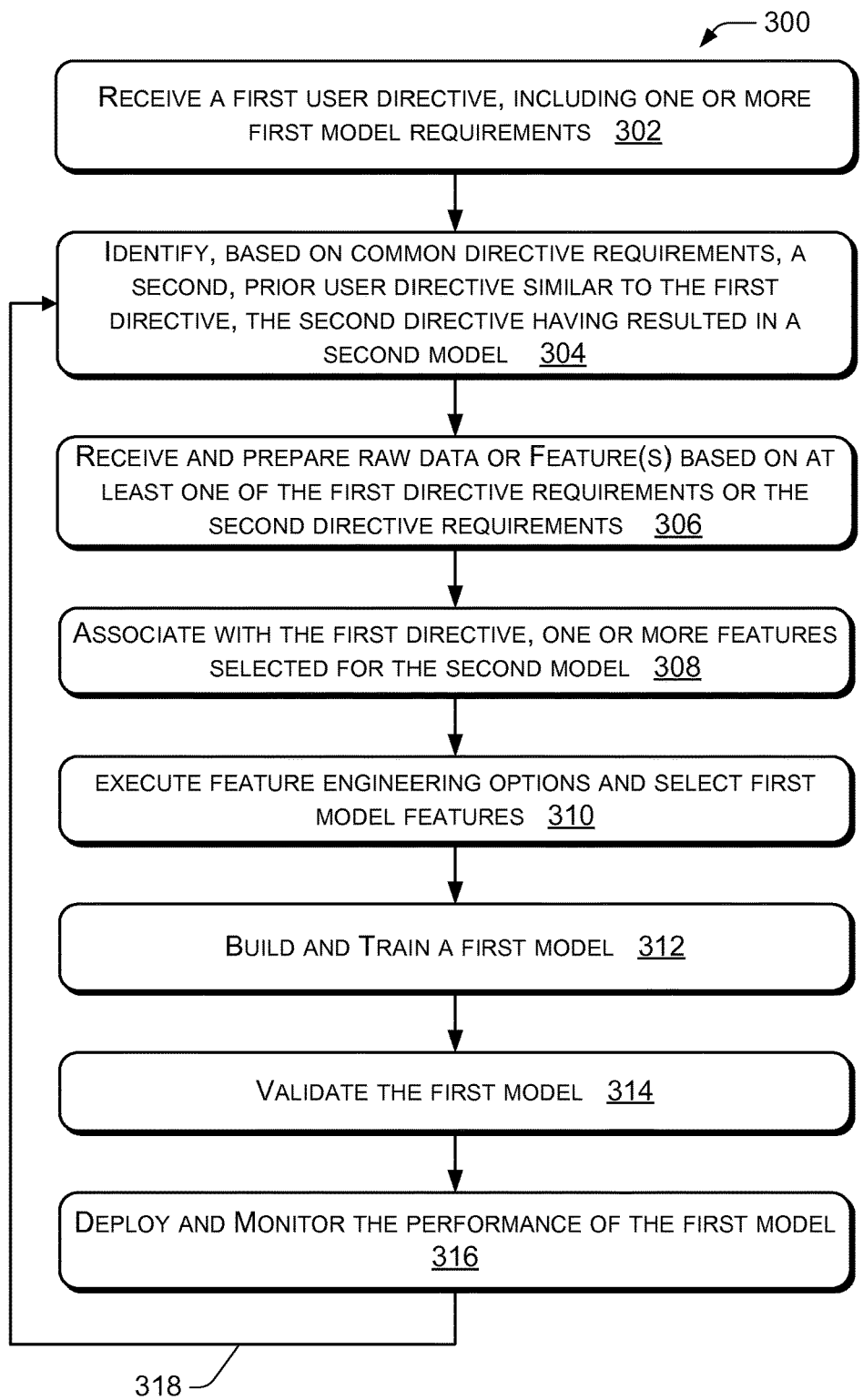
FIG. 3 is a flow diagram of an illustrative process for an automated model development process.

FIG. 3 is a flow diagram of an illustrative process 300 for an automated model development process. The order in which the operations are described is not intended to be construed as a limitation, and any number of the described blocks can be combined in any order and/or in parallel to implement the processes. The process 300 is described with reference to FIG. 1.

At 302, the Model Factory 102 receives a current user directive 104($n$) which includes one or more model requirements. For instance, the model requirements may include at least a target feature. Additionally, the requirements may include one or more raw data sources, or portions thereof, and one or more process steps to be conducted by the Model Factory 102. The user then executes the user directive.

At 304 the Model Factory 102 identifies at least one prior user directive determined to be similar to the current user directive. For instance, the Model Factory may compare individual requirements of the current user directive 104($n$) and the one or more prior user directives to determine a similarity score associated with each comparison. One comparison, for example, may determine whether the user directives identify the same raw data source(s) or portions thereof. A second comparison, for example, may be to determine whether the user directives being compared require the same target feature.

Furthermore, the Model Factory 102 may assign a weighting value to each of the similarity scores and aggregate the results to create a single score for the comparison of the current user directive 104($n$) and individual ones of the prior user directives. Weighting values may be specified by a user as an additional requirement that is included in the user directive. Alternatively, weighting values may be a standard value. Alternatively, the Model Factory may change one or more weighting values based on the monitored performance of one or more deployed ML models.

The Model Factory 102 may rank each comparison to determine a prior user directive having the highest comparison score.

At 306, the Model Factory 102 may request and prepare raw data or one or more features from the raw data sources 106 based on a requirement of the current user directive and/or a prior user directive. For example, if the user indicates a particular first set of raw data in the current user directive, the Model Factory 102 may receive only the first set of raw data. Alternatively, if the current user directive 104($n$) fails to indicate a required first set of raw data, the Model Factory 102 may request a second raw data set, the second set being associated with a prior common user directive. Alternatively, where the current and prior user directives are associated with a first and second raw data set, respectively, the Model Factory 102 may aggregate the first and second data set or append the first raw data set with the second regardless of the current user directive. Data preparation may further include automatically identifying erroneous feature values or imputing missing values.

At 308, the Model Factory 102 associates with the current user directive features associated with the prior user directive and the features are selected for model development of the current model. In addition, or alternatively, the Model Factory 102 may prune features prior to model generation using a combination of correlation and/or model based feature selection techniques to arrive at a smaller feature set having optimized predictive capability.

Following the association of prior model features with the current model build via the first user directive, the Model Factory 102 may identify one or more engineered features not applied to a prior model build at 310. Furthermore, the Model Factory 102 may select one or more features from the set of associated features and the one or more engineered features to apply to the current model build. For instance, when developing the current model, the Model Factory 102 may apply a similar numeric feature strategy that was applied to create the prior model. Furthermore, model performance monitoring may associate a performance value with individual models, individual model parameter values, and/or model-feature associations. The identified feature engineering operation may be identified based on the previous success associated with the prior model as measured by the performance of the prior model.

Based on the performance of the second model and/or individual model parameter values, the Model Factory 102 builds and trains a model at 312. Training the model may consist, at least in part, on tuning model parameters. At 314, the model may be validated using cross-validation techniques at 314.

At 316, the model is deployed and the performance of the model is continuously monitored. Continuous monitoring may include, for example, determining a performance value associated with the deployed model. Continuous monitoring may be conducted at predetermined periodic or intermittent intervals. The Model Factory 102 may receive input or output data associated with the model to monitor changes in the distribution of the data over a period of time. Additionally or alternatively, the Model Factory 102 may monitor the performance of the model. Based on changes identified in the data distribution or model performance, the Model Factory 102 may trigger retraining of the model 318. Model performance monitoring is discussed further with respect to FIG. 5.

Figure 4:
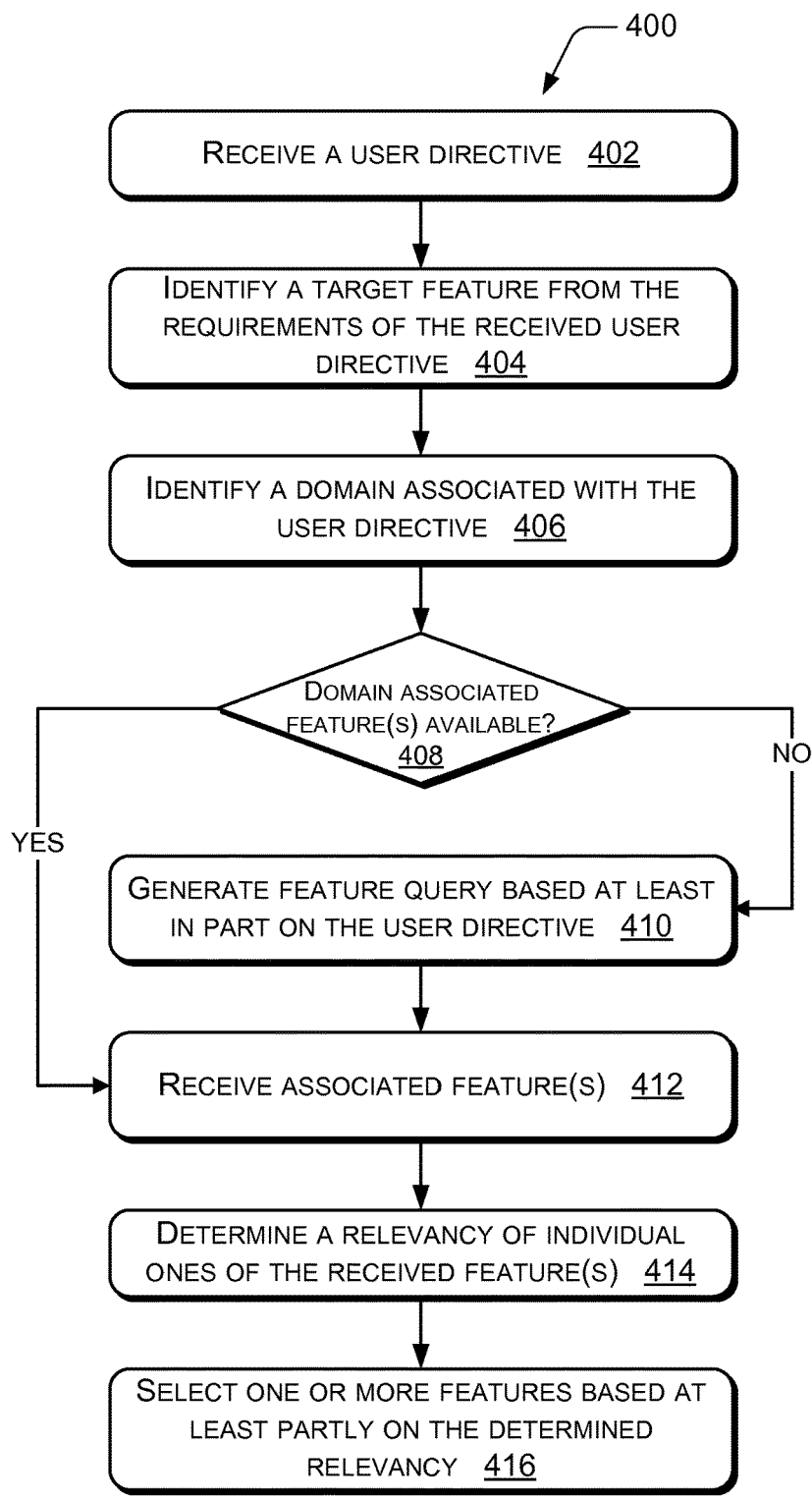
FIG. 4 is a flow diagram of an illustrative process for the generation and utilization of a feature warehouse and for selecting one or more features for ML model development.

FIG. 4 is a flow diagram of an illustrative process 400 for the generation and utilization of a feature warehouse and selecting one or more features for ML model development. The order in which the operations are described is not intended to be construed as a limitation, and any number of the described blocks can be combined in any order and/or in parallel to implement the processes. The process 400 is described with reference to FIG. 1.

At 402 a Model Factory 102 receives a user directive, including one or more requirements of a ML model (e.g., a raw data source, a target feature, etc.). The Model Factory 102 parses the user directive to identify a target feature from the requirements of the user directive at 404.

At 406, the Model Factory 102 associates a domain with the user directive based on the one or more requirements parsed from the user directive. For instance, the Model Factory 102 may determine a domain to be associated with the user directive based on the one or more raw data sources, the target feature, a previous user directive, etc. Additionally, the Model Factory 102 may determine that a similar, prior user directive shares one or more common requirements and, based on the domain associated with the prior user directive, may associate the same or similar domain to the user directive.

At 408, the Model Factory 102 determines whether one or more domain-associated features are available from the domain feature warehouse 108. The domain feature warehouse 108 may contain feature data and domains associated therewith. Additionally, or alternatively, features stored in the domain feature warehouse 108 may contain indicators of a reference location to the feature data in one or more raw data sources 106 and an associated domain. Additional indicators or flags may also be associated with the feature data such as model performance data.

If no domain-associated feature is available, the Model Factory may generate a feature query at 410 based at least in part on the parsed requirements of the user directive. In some instances, the user directive may contain one or more manual feature queries 112. However, where no feature is provided by the user directive, the Model Factory 102 may generate a feature query 110 based on one or more requirements parsed from the user directive and/or one or more prior user directives associated with the user directive.

At 412, the Model Factory 102 receives one or more associated features from the domain feature warehouse 108, a manual feature query, or an automated feature query. The manual feature query 112 and/or the automated feature query 110 may be logged and used to populate the domain feature warehouse for later use by the Model Factory 102

At 414, the Model Factory 102 determines a relevancy of individual ones of the received features. Relevancy values may be determined based on the predictive value of the features relative to a model resulting from a prior user directive. For instance, the Model Factory 102 may be continuously monitoring the performance of a prior model and reporting results back to the domain feature warehouse 108. The domain feature warehouse may associate performance values with individual features, data points, or model-feature relationships, for example. Based on the associated performance values and the determined similarity between the current user directive 104(n) and the prior user directive from which the model being monitored was generated, the Model Factory 102 determines a relevance of the individual features. In this way, the Model Factory 102 improves the initial performance of any deployed ML model. Initial performance is the measured performance of a model for an initial period of time from the model's first deployment. Additionally, the Model Factory 102 continuously improves over time based on the monitored result of prior deployed ML models. At 416 the Model Factory 102 then selects one or more features to create an ML model based at least partly on the determine relevancy.

Figure 5:
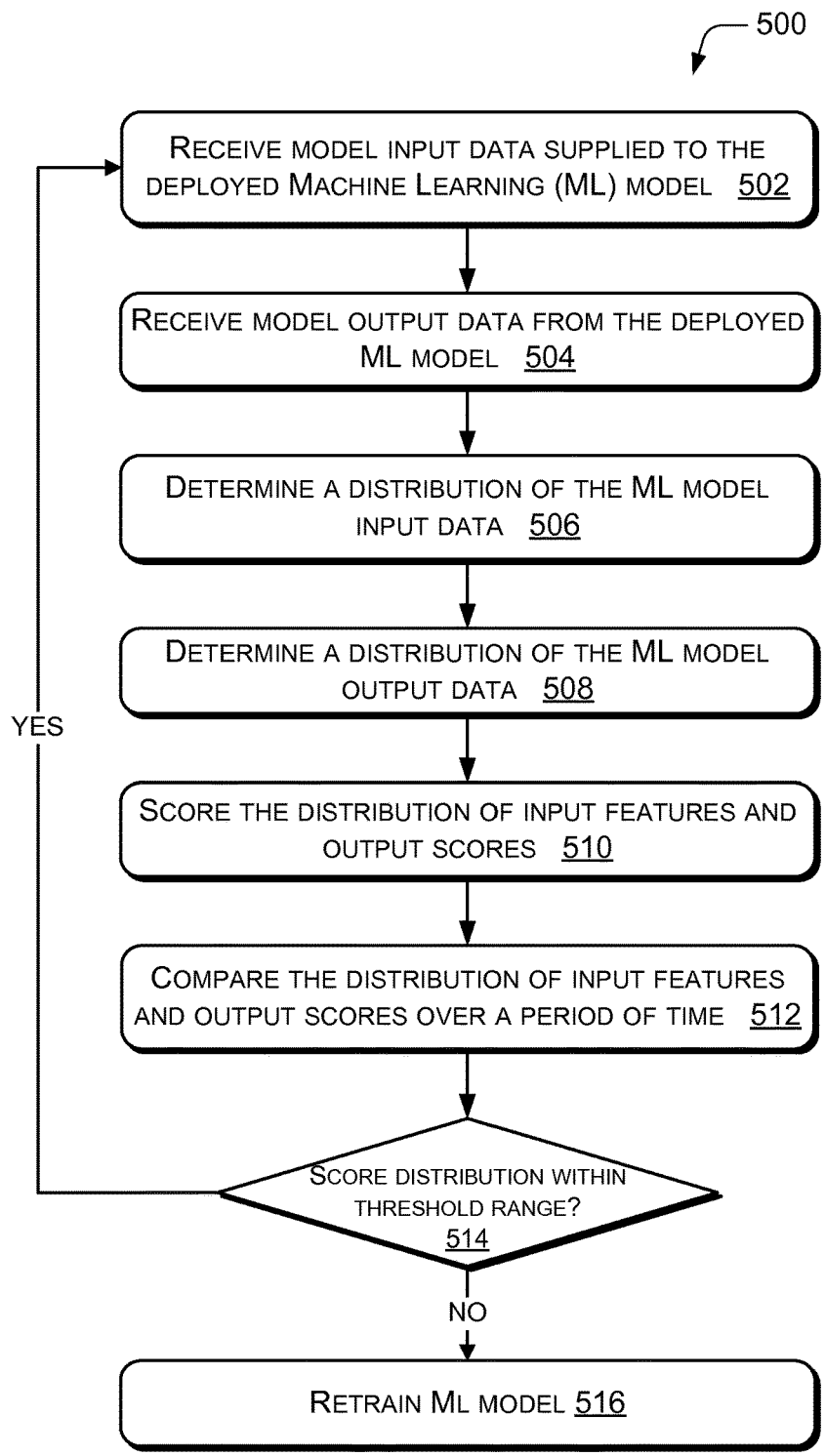
FIG. 5 is a flow diagram of an illustrative process for continuous model performance monitoring and model performance improvement.

FIG. 5 is a flow diagram of an illustrative process 500 for continuous model performance monitoring and model performance improvement. The order in which the operations are described is not intended to be construed as a limitation, and any number of the described blocks can be combined in any order and/or in parallel to implement the processes. The process 500 is described with reference to FIG. 1.

Subsequent to deployment of a Model Factory 102 generated ML model 114, the Model Factory 102 may monitor the performance of the deployed ML model 114. At 502, the Model Factory 102 receives model input data 116. The received model input data may be a copy of the data supplied to the ML model 114, or a reference location to the input data within one or more raw data sources 106.

At 504, the Model Factory 102 receives model output data 118 from the deployed ML model. The model output data 118 may be a copy of the output data or a reference indicating a location of the data in a data store. Still further, the reference may be a copy of the ML model and a reference to one or more raw data sources 106, or portions thereof, the raw data sources being identical to the model input data raw data source(s).

At 506, the Model Factory 102 determines a distribution of the model input data 116. Furthermore, the Model Factory 102 may additionally or alternatively determine a distribution of the ML model output data at 508. The distribution measurements may be a measure of statistical variance, for example a measure relative to a general tendency of the data such as mean, median, mode; and/or some measure of dispersion of the data such as the average deviation from the mean, mean square deviation, or root mean square deviation. The determined distribution of each of the data points in the input features and output scores is associated with a distribution score at 510.

At 512, the Model Factory 102 compares the distribution of scores over a period of time. The period of time may be predetermined by the user directive associated with the model. Additionally, or alternatively, the period of time may be determined based at least partly on the relative distribution of the input or output data. For instance, where either one or both of the input and output data has a high distribution score, indicating a high degree of distribution of the data, the time period may be shorter than for a model having an input or output data distribution that has a lower score, indicating a lower degree of distribution of the data. Additionally, the determined period of time may reflect the performance of the ML model. For instance, a ML model having a high performance may compare score distribution at longer time intervals than a ML model having a poor performance.

At 514, the Model Factory 102 determines whether the score distribution is within a threshold range. The threshold range may be determined from the user directive, or by comparing score distributions over time. Score distributions falling outside of the determined threshold range are retrained at 516. Retraining the ML model 516 may also include refreshing, rebuilding, or rescoring the ML model. Scores reflecting an acceptable level of distribution (i.e., within the threshold range) result in continued ML performance monitoring at 502. Data sampling rates may be determined comparing score distribution over time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method to automatically generate machine learning (ML) models, the method comprising:
receiving a first user directive including one or more first model requirements;
identifying a prior user directive associated with one or more prior model requirements and a prior model, the one or more prior model requirements and the one or more first model requirements including at least one common requirement, wherein the at least one common requirement includes at least one of a common target feature or a common raw data source, the common target feature including an instruction predict a percentage of customers likely to sign up for a subscription service and the common raw data source including customer behavior data, and wherein identifying the prior user directive comprises:
  comparing at least one first model requirement of the one or more first model requirements with at least one prior model requirement of the one or more prior model requirements,
  determining, based at least in part on the comparing of the at least one first model requirement and the at least one prior model requirement, a similarity score associated with the prior user directive, and
  selecting the prior user directive from a plurality of prior user directives based at least in part on the similarity score;
selecting, based at least in part on the prior user directive, one or more features used to build the prior model;
training, based at least in part on the prior user directive, a first model to determine one or more first model parameter values;
determining a performance value of the first model;
monitoring, via an at least partially automated process, the performance value to determine a distribution of the performance value over a period of time; and
associating, based at least in part on the monitoring of the performance value, the performance value of the first model with at least one of the one or more features.

2. The method of claim 1, wherein the first user directive and the prior user directive are associated with a same domain, the same domain being a membership subscription service propensity.

3. The method of claim 1, the method further comprising:
determining that the similarity score meets or exceeds a threshold similarity score value; and
selecting one or more additional features used to build the prior model based at least in part on determining that the similarity score meets or exceeds the threshold similarity score value.

4. The method of claim 1, further comprising appending individual features of the one or more features to include at least one of an indication of an associated machine learning algorithm, an identifier of one or more domains associated with the feature, or the performance value of the first model.

5. The method of claim 1, further comprising, retraining the first model based at least in part on determining that a distribution of the performance value is at least one of outside a threshold distribution range, meets a threshold distribution value, or exceeds the threshold distribution value.

6. A system comprising:
one or more processors;
memory accessible by the one or more processors; and
one or more computer-executable instructions stored in the memory and executable on the one or more processors to perform operations comprising:
  receiving a first user directive including at least one first model requirement;
  determining, based at least in part on the first user directive, a prior user directive associated with one or more prior model requirements, the one or more prior model requirements and the at least one first model requirement including a common requirement, wherein the common requirement includes at least one of a common target feature or a common raw data source, and wherein determining the prior use directive comprises:
    comparing the at least one first model requirement with at least one prior model requirement of the one or more prior model requirements,
    determining, based at least in part on the comparing of the at least one first model requirement and the at least one prior model requirement, a similarity score between the first user directive and the prior user directive, and
    determining the prior user directive based at least in part on the similarity score;
  identifying one or more features associated with the prior user directive;
  selecting at least one selected feature of the one or more features;
  generating, in response to the receiving of the first user directive, a first model using the at least one selected feature;
  determining a performance of the first model; and
  monitoring, via an at least partially automated process, the performance of the model to determine changes in model performance over a period of time.

7. The system of claim 6, the operations further comprising:
extracting, via file parsing, one or more additional first model requirements associated with the first user directive, and wherein determining the similarity score is further based at least in part on comparing at least one of the one or more additional first model requirements with the one or more prior model requirements;
determining that the similarity score meets or exceeds a threshold similarity score value; and
associating one or more additional features of the prior user directive with the first user directive based at least in part on determining that the similarity score meets or exceeds the threshold similarity score value.

8. The system of claim 7, wherein the similarity score is further based at least in part on a weight assigned to individual comparisons of the one or more additional first model requirements and the one or more prior model requirements.

9. The system of claim 6, wherein determining the performance of the first model includes appending the at least one selected feature with an indicator to obtain an appended featured, and the operations further comprising, selecting, based at least in part on the indicator, the appended feature for a second model.

10. The system of claim 6, wherein individual features of the one or more features are appended to include at least one of an indication of an associated machine learning algorithm, an identifier of one or more domains associated with the feature, or a relevancy value associated with a previous performance of a previously deployed model using the feature.

11. The system of claim 6, wherein the first user directive and the prior user directive are associated with a same domain.

12. The system of claim 6, the operations further comprising:
   determining, by parsing the first user directive, that a domain commonly associated with the first user directive and the prior user directive does not include at least one associated feature;
   requesting an updated user directive including at least one feature query;
   receiving the at least one feature query; and
   associating the at least one feature query with the domain.

13. The system of claim 6, the operations further comprising:
   determining, by parsing the first user directive, that the first user directive does not include a target feature;
   identifying the target feature of the prior user directive; and
   associating the target feature with the first user directive.

14. The system of claim 6, the operations further comprising:
   determining, by parsing the first user directive, one or more feature queries associated with the first user directive; and
   associating the one or more feature queries with a domain of the first user directive.

15. One or more non-transitory computer-readable media maintaining instructions executable by one or more processors to perform operations comprising:
   receiving model input data and model output data of a model, wherein the model input data includes at least one of customer behavior data or a raw data source;
   determining a distribution of the model input data and of the model output data over a first period of time, wherein the first period of time is predetermined based at least in part on a user directive associated with the model;
   determining, based on the distribution of the model input data and of the model output data, a first distribution score associated with the model input data and a second distribution score associated with the model output data;
   determining a second period of time based at least in part on at least one of the first distribution score or the second distribution score;
   monitoring, via an at least a partially automated process, changes in the first distribution score and in the second distribution score over the second period of time; and
   retraining the model based at least in part on a determination that the changes of at least one of the first distribution score or the second distribution score are outside of a threshold distribution range.

16. The one or more non-transitory computer-readable media of claim 15, the operations further comprising:
   determining, based at least in part on the first distribution score and the second distribution score, a model performance value; and
   appending one or more features used for generating the model with an indication of the model performance value.

17. The one or more non-transitory computer-readable media of claim 16, wherein the retraining further comprises determining, based at least in part on the model performance value, an updated user directive associated with the model, the updated user directive including at least one of one or more additional features or one or more alternative features.

18. The one or more non-transitory computer-readable media of claim 15, wherein the receiving the model input data and the model output data comprises receiving at least one of a first reference to an input data location or a second reference to an output data location.

19. The one or more non-transitory computer-readable media of claim 15, wherein at least one of the first distribution score of the model input data or the second distribution score of the model output data includes a measure of statistical variance during at least one of a third period of time or a point in time.

20. The one or more non-transitory computer-readable media of claim 15, wherein the second period of time is longer than the first period of time.

* * * * *